E. N. McKIMM & J. R. GEARHART.
Horse Hay-Forks.
No. 148,731.                        Patented March 17 1874.
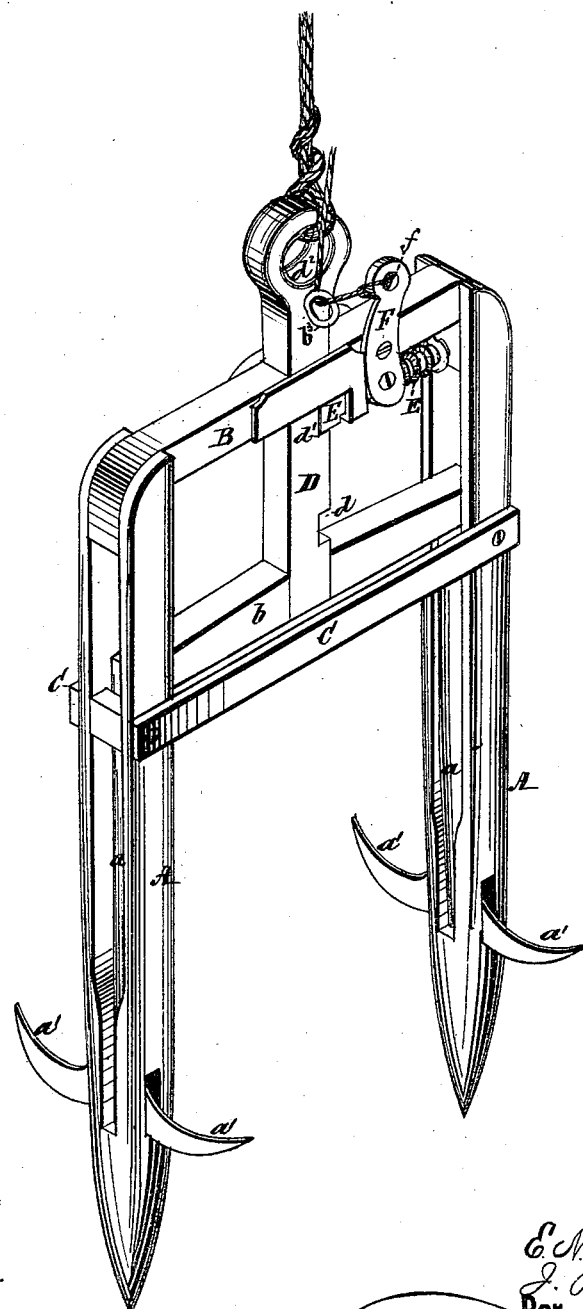
Witnesses:                        Inventor:

UNITED STATES PATENT OFFICE.

EDGER N. McKIMM AND JOHN R. GEARHART, OF LATHROP, MISSOURI.

IMPROVEMENT IN HORSE HAY-FORKS.

Specification forming part of Letters Patent No. 148,731, dated March 17, 1874; application filed November 17, 1873.

*To all whom it may concern:*

Be it known that we, EDGER N. McKIMM and JOHN R. GEARHART, of Lathrop, in the county of Clinton and State of Missouri, have invented a new and useful Improvement in Horse Hay-Forks; and we do hereby declare that the following is a full, clear, and exact description of the same, reference being had to the accompanying drawing forming a part of this specification, in which the figure is a perspective view.

The invention is an improvement in the class of forks provided with hinged tines which are operated by a rod or rods, adapted to slide or move vertically; and it consists in constructing and arranging the several parts as hereinafter described generally, and indicated specifically in the claim.

The main frame of the fork is composed of the two pointed parallel prongs, A A, connected at the top by a cross-bar, B, and also a little above their middle by the bars C C. The prongs are each slotted or bifurcated from near the point to their upper end to adapt them to receive the bars $a$ $a$, which constitute the inner or supplementary portion of the fork-frame. The upper ends of said inner bars $a$ $a$ are connected by cross-bar $b$, and to each of their lower ends is pivoted a pair of curved tines or arms, $a^1$ $a^1$, which project out, as shown in drawing, through opposite slots in the prongs A whenever the bars $a$ are forced downward, being retracted in the slots, and concealed when its bars $a$ are moved upward. To guide the bars $a$ as they slide up and down therein while the fork is in use, a bar, D, is attached to the middle of the cross-bar $b$, and passes upward through a keeper or slot of the head-piece B. This bar has a ring, $a^2$, at its upper end for attachment of a hoisting rope or chain. The means of locking the inner and outer frame of the fork, so that they are relatively immovable either with the tines $a^1$ retracted or projected, is a catch or bar, E, which slides in guides on the under side of head-piece B, and is acted on by a spiral spring, which is shown coiled around the reduced end thereof. Notches $d$ $d'$ are formed in the side of the guide-bar D to receive the head of locking-bar E, and according as the latter is engaged with the lower or upper notch are the tines $a$ retracted or projected, and the fork in readiness to be thrust into the hay, or to elevate it.

The disengagement is effected by a trip-lever, F, which is pivoted respectively to the lock-bar E and head-piece B. A trip-cord of suitable length is connected with the lever at $f$.

The function of the cross-bars C is especially to form an integral and essential part of the main frame of the fork; also, to limit the extent to which the prongs A can be thrust into the hay; also, when the tines $a^1$ are thrust out, the hay to be elevated will be confined, or clamped, as it were, between them and said bars, so that it will not scatter or fall off. The bars are likewise so located that the foot of the operator may be conveniently applied thereto to force the prongs down into the hay, while his hands may be applied to the guide-bar D as a handle.

By the above-described construction the inner frame of the fork is partly inclosed or concealed within the other, is guided therein by the bar to which the hoisting-rope is attached, and the two frames are readily and securely locked together in either adjustment.

As a whole, the fork is easily handled and operated, and is, withal, simple in construction, as well as light, strong, and durable.

We do not claim, broadly, the combination, with one or more prongs, of a bar or bars for operating hinged tines; but

We claim—

The slotted or bifurcated parallel prongs A A and connecting-bars B and C C, forming the main frame of the fork, and the sliding bars $a$, having hinged tines $a^1$ $a^1$, the cross-bar $b$, the central guide and hoisting-bar D, with notches $d$ $d$, the spring-locking bar E, and lever F, forming the inner or sliding frame, all combined and arranged as shown and described.

The above specification of our invention signed by us this 5th day of November, A. D. 1873.

EDGER N. McKIMM.
     JOHN R. GEARHART.

Witnesses:
 JAMES G. BARRETT,
 JOHN F. STEVENS.